United States Patent [19]

Nicholas et al.

[11] Patent Number: 5,400,425
[45] Date of Patent: Mar. 21, 1995

[54] FIBEROPTIC ILLUMINATOR FOR INFANT CARE

[75] Inventors: Howard B. Nicholas, Baltimore, Md.; Anthony D. Buttitta, Libertyville, Ill.

[73] Assignee: Ohmeda Inc., Liberty Corner, N.J.

[21] Appl. No.: 242,907

[22] Filed: May 13, 1994

[51] Int. Cl.⁶ .............................................. G02B 6/00
[52] U.S. Cl. ..................... 385/76; 385/901; 385/31; 362/32
[58] Field of Search ............. 385/901, 31, 76, 77, 385/137; 362/32

[56] References Cited

U.S. PATENT DOCUMENTS

| | | | |
|---|---|---|---|
| 5,136,480 | 8/1992 | Pristash et al. | 362/32 |
| 5,184,253 | 2/1993 | Hwang | 362/32 |
| 5,243,500 | 9/1993 | Stephenson et al. | 362/32 |
| 5,283,718 | 2/1994 | Stephenson et al. | 362/32 |
| 5,339,223 | 8/1994 | Kremenchugsky et al. | 385/901 |

*Primary Examiner*—Rodney B. Bovernick
*Assistant Examiner*—Phan Thi Heartney
*Attorney, Agent, or Firm*—Roger M. Rathbun; Larry R. Cassett

[57] ABSTRACT

An illuminator for use with a variety of end use light emitting devices for administering light for therapy and/or observation of an infant. One of the end use emitting devices is a device to provide phototherapy to the infant and is prevented by the illuminator from emitting light that has not been filtered to select the desire spectrum of wavelengths for phototherapy. The illuminator prevents the introduction of a connector to the phototherapy device from being inserted to an operative, secured position unless the proper filter is in position to filter out all of the undesired wavelengths before the light radiation can reach the phototherapy end use emitting device. Other end use light emitting devices may, however, be used with the same illuminator and their connectors are readily inserted into the illuminator to receive light radiating from the illuminator to the end use light emitting device.

7 Claims, 3 Drawing Sheets

FIBEROPTIC ILLUMINATOR FOR INFANT CARE

BACKGROUND OF THE INVENTION

This invention relates to light emitting devices used in the treatment and/or observation of infants and, specifically, to an illuminator that is adapted to be used with more that one end use light emitting device to act as a light source via a fiberoptic cable to the end use device.

One apparatus currently on the market that provides phototherapy to an infant is the fiberoptic light therapy system marketed under the trademark Biliblanket by Ohmeda Inc. That system basically comprises an illuminator and which is a box containing a light source, normally a quartz halogen lamp, as well as filters and associated electrical connections and control components. A fiberoptic pad that is woven from optical fibers and normal the woven fiberoptic pad is coupled, or woven to the ends of a fiberoptic cable.

That fiberoptic cable contains multiple individual optical fibers; the aforementioned commercial apparatus has about 2400 individual optical fibers in its fiberoptic cable. At the free end of the fiberoptic cable, a connector is provided so that the fiberoptic pad and cable can be readily connected and disconnected from the illuminator. The illuminator itself, is relatively expensive and can be used continually while the fiberoptic pad may be replaced when worn or disconnected for cleaning.

Since the procedure of phototherapy requires light radiation of within a fairly specific wavelength range, there is a filter within the illuminator that filters out most of the electromagnetic spectrum so that only light radiation having wavelengths in the range of about 400–550 nanometers is emitted toward the skin of the infant. Accordingly, it is important that the light from the illuminator transmitted via the fiberoptic cable to the fiberoptic pad be limited to radiation within that limited spectrum.

Other devices, however, are used in caring for or observing infants and which may also have a fiberoptic cable with a light emitter at one end thereof. One of such devices is a transilluminator and which is a bright light that is used to allow the physician to observe actually through a portion of the infant, such as an arm. Transilluminators are used for a variety of purposes with infants, such as in locating venepuncture sites, carrying out pneumothoraces, that is, viewing the infant's lungs and hydrocephalus, that is, actually viewing the infant's brain.

The device therefore requires considerable light but is capable of employing more of the spectrum of light radiation than is used for light therapy. Again, an illuminator is used to supply the light through a fiberoptic cable to reach and be emitted from the transilluminator.

Since the illuminator is relatively expensive, and space is at a premium around infants during treatment, it would be advantageous if the same illuminator could be utilized with more that one light emitting device. In addition, the cost to the user would be reduced by the availability of a universal or adaptable illuminator that is capable of supplying light radiation for phototherapy as well as other dedicated light emitting devices however, for safety reasons, it is also important to ensure that when a woven fiberoptic pad is employed for phototherapy, only the proper filtered wavelengths be allowed to reach the infant.

SUMMARY OF THE INVENTION

The present invention provides an apparatus comprising a unique illuminator and a plurality of light emitting devices that may be used with the same illuminator. One of the light emitting devices is the fiberoptic pad used for phototherapy and therefore only emits light radiation having wavelengths within a certain relatively narrow spectrum, i.e. between about 400 and 550 nanometers.

The other light emitting device may be one of a variety of devices that allow the full spectrum to be emitted or, alternatively, that allow light to be emitted at wavelengths different that those used for the phototherapy.

The illuminator includes a lamp to generate the light radiation and a receptor that has a plurality of apertures, preferably two apertures, one of which is large and which is used for snugly receiving the end of the phototherapy device connector. The various connectors are locked into a secured position in the illuminator in order to be operative, that is, in order to receive light radiation from the lamp.

Various connectors can, therefore, be locked into an operative, secured position in the illuminator, however only one at a time can be in the operative or secured position and the connector for the phototherapy device can only be put into a secured position when aligned with the larger aperture specifically designed for it. That larger aperture also has the specific filter needed for phototherapy and therefor the connector for the phototherapy device cannot inadvertently be secured into operative, secured position in the illuminator without having the proper filter to allow only the desired wavelengths to reach the infant from the end use emitting device, i.e. woven fiberoptic pad.

Thus, while various light emitting devices may use the same illuminator, the infant is protected during phototherapy from the emission of light at unsuitable wavelengths therefor, since the phototherapy light emitting fiberoptic pad cannot be connected to the illuminator in an operative, secured position unless the proper filter is in place between the lamp and the phototherapy device connector.

Other features of the illuminator will become more apparent in light of the following detailed description of a preferred embodiment thereof and as illustrated in the accompanying drawings.

DESCRIPTION OF THE PREFERRED EMBODIMENT

Figure 1:
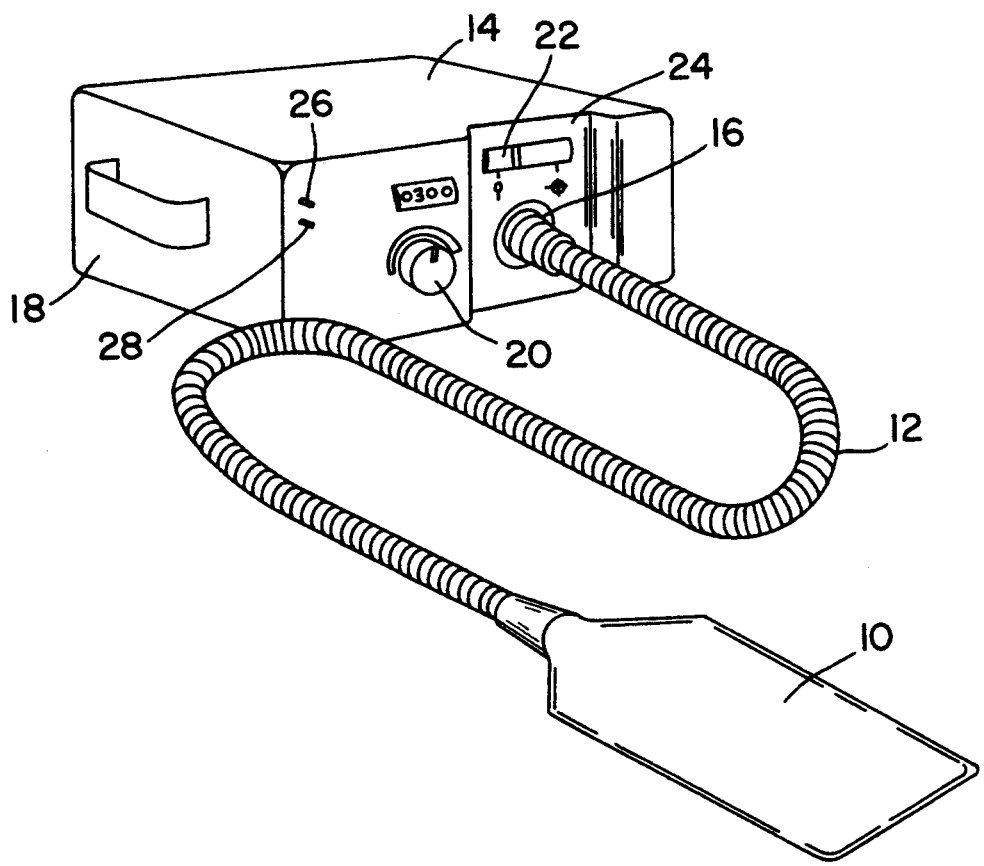
FIG. 1 is a an isometric view of an illuminator constructed in accordance with the present invention and having a light emitting phototherapy device connected thereto.

Referring now to FIG. 1, there is shown an isometric view of an apparatus for the administration of light radiation through various light emitting devices for application to an infant for observation and/or light phototherapy. Taking first, the application of phototherapy, such device comprises a commercially available apparatus including a woven fiberoptic pad 10 which is adapted to be positioned on or adjacent the infant such that light radiation emitted from the device impinges on the skin of the infant. The woven fiberoptic pad 10 can be constructed in accordance with the teaching of Daniel U.S. Pat. No. 4,224,907 and comprises individual optical fibers woven with normal threads such that light is emitted at a uniform pattern for application to the infant at a desired optimum range of wavelength.

A fiberoptic cable 12 provides a light transmissive coupling between the woven fiberoptic pad 10 and an illuminator 14. The fiberoptic cable 12 has a protective coating of a plastic material such as vinyl and contains a plurality of individual optical fibers, not shown in FIG. 1, and which transmit the light from the illuminator 14 to the woven fiberoptic pad 10 for emission toward the infant. As an example, in the commercial phototherapy apparatus available from Ohmeda Inc. there are about 2400 individual optical fibers contained within the protective coating.

A connector 16 is affixed to the distal end of the fiberoptic cable 12 and is inserted into the illuminator 14 to receive the light radiation as will be explained.

The illuminator 14 basically includes a housing 18 that contains the various components that are needed to provide and control the light radiation for the phototherapy. In particular, the illuminator 14 will include a power switch 20 for controlling the power to the apparatus to turn the light on and off as well as to control the intensity of that light as desired by the user.

A slide 22 is provided and which is slidable between two positions, one of which is seen in FIG. 1 in its left position and the other, right position is attained by the user simply moving the slide 22 to that position. As will be seen, the slide 22 controls a mechanical mechanism within the housing 18 and various indicia may be displayed on the front bezel 24 of the illuminator 14 so that the user can ascertain which position the slide 22 is in with respect to its function.

Internal of the housing 18 is a lamp, typically a quartz halogen lamp, not shown in FIG. 1, that provides the light radiation for the system. Also within the housing 18 are the various electrical components and optical components, the latter including filters to obtain the desired wavelength of the light radiation delivered to the fiberoptic cable 12 in the range of about 400 to 550 nanometers. Other filters may filter out infrared and UV radiation spectrums from the light radiation delivered.

Various other conventional features are provided on the front bezel 24 and include an indicator light 26 to show the user that the power is on and a warning light 28 that may provide an indication to the user of a system failure, such as, for example, if the cooling system fan ceased to operate and a high, possibly hazardous, temperature may thus be approached within the housing 18.

Figure 1A:
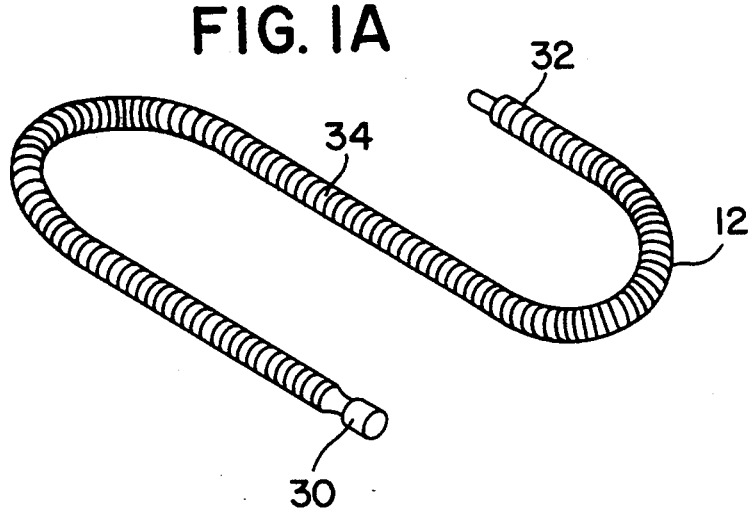
FIG. 1A is an isometric view of an alternate light emitting device usable with the illuminator of FIG. 1.

Turning now to FIG. 1A, there is shown an alternate light emitting device that is usable with the light illuminator 14 of the present invention. The alternate device is a transilluminator 30 and which also receives light radiation by means of a connector 32 that plugs into the illuminator 14, as will be explained, and the light is thus transmitted through a fiberoptic cable 34. Basically the transilluminator 30 is representative of various light emitting devices that may be used with the illuminator 14 of the present invention. Others include an observation lights, examination lights and the like.

The transilluminator 30 is used to see through a portion of the infants body and the light radiates outwardly therefrom with a relatively full spectrum of visible wavelengths. In particular, the transilluminator 30 may receive the light radiation directly from the lamp within housing 18 or may be filtered to remove various wavelengths such as in the infrared range to eliminate heat in the system.

Figure 2:
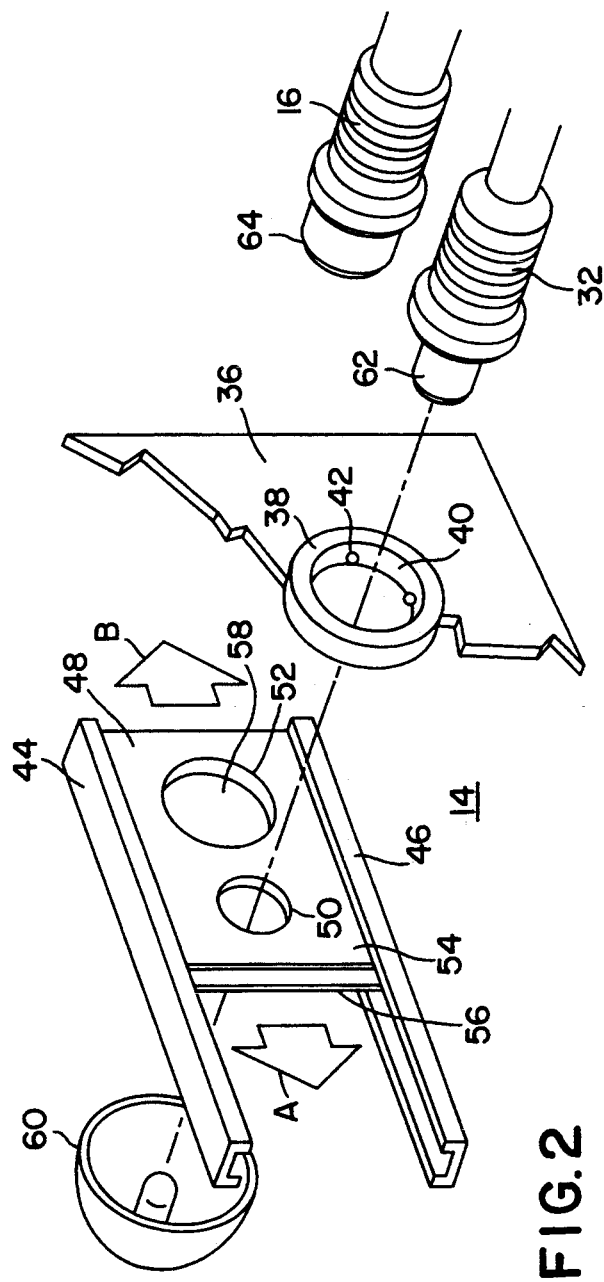
FIG. 2 is an isometric view, broken away, showing components of the illuminator constructed in accordance with the present invention.

Turning now to FIG. 2, there is shown an isometric view, partly broken away, and showing a portion of the light illuminator 14 of the present invention. A front plate 36 is located in the front of the illuminator 14 just behind the front bezel 24 (FIG)1. A ring 38 is mounted in front plate 36 and has an opening 40 of a predetermined diameter as will later be explained. Within ring 38 are positioned a plurality of metal balls 42 biased inwardly toward opening 40 and which serve to retain the connectors 16 and 32 firmly in position with respect to the front plate 36 when the connectors 16, 32 are positioned in their secured positions.

Progressing further into the illuminator 14, there is a receptor means comprising a pair of upper and lower tracks 44, 46 affixed firmly in position within illuminator 14. Slidably positioned within the tracks 44, 46 is a receiver 48 having a pair of apertures 50, 52 the larger aperture being designated as 52 and as will be seen is adapted to be used with the woven fiberoptic pad 10 (FIG. 1.) In the preferred embodiment, the receiver 48 is made of a front plate 54 and a back plate 56 and which are joined together and move together. A filter media 58 covers at least the larger aperture 52 by covering that larger aperture in the back plate 56.

Finally, a lamp 60, preferably a quartz halogen lamp is firmly affixed in position within the illuminator 14 and provides the light radiation to the various devices for emitting light radiation to or upon the infant.

As can be seen, by the position of the filter media 58 in the back plate 56, light radiation from the lamp 60 cannot pass through the larger aperture 52 without being filtered by the filter media 58. The filter media 58 allows light radiation in the wavelengths of between about 400–550 nanometers to pass therethrough.

The receiver 48, as can be seen, can be moved along the upper and lower tracks 44, 46 to one of two positions by the operator simply moving the slide 22 (FIG. 1) between its two positions. In one position, as shown in the FIG. 2, the smaller aperture 50 is aligned with the lamp 60 and the centerline of the ring 38. In the other of the positions, the receiver 48 can be slid in the direction of the arrow A such that the larger aperture 52 is aligned between the lamp 60 and the centerline of the ring 38. The procedure is reversed by sliding the receiver 48 in the direction of arrow B to position the smaller aperture 50 in the said position. Thus, by manually sliding the receiver 48 in the direction of arrow A or B, either the smaller aperture 50 or the larger aperture may be positioned in alignment with the lamp 60 and the centerline of the ring 38.

As can be seen, therefore, the operator may move the slide 22 between its two positions and choose the particular aperture that is in alignment with the lamp 60 and the centerline of ring 38.

Also shown in FIG. 2 is connector 32 used with the transilluminator 30 and connector 16 used with the woven fiberoptic pad 10 for phototherapy to be applied to an infant. As will be noted in FIG. 2, the distal ends 62 and 64, respectively, of connectors 32 and 16 are of dissimilar diameters. As used herein, the distal end of a connector will refer to the end of the connector that is inserted into the illuminator 14 and the proximal end of a connector will be the end facing the fiberoptic cable.

As is apparent in FIG. 2, the larger diameter distal end 64 is not aligned in position to be inserted into the ring 38, however, its larger diameter is predetermined to fit snugly within the aperture 58 when the connector 16 is so aligned and is inserted into the ring 38 and the receiver is in its position where the larger aperture 52 is aligned with lamp 60 and the centerline of the ring 38.

In the arrangement as presently depicted in FIG. 2, however, the smaller diameter distal end 62 of the connector 32 is currently aligned so as to be inserted into the ring 38 and, as will be shown, the distal end 62 is of a predetermined diameter so as to fit snugly within the smaller aperture 50 when the connector 32 is inserted into the illuminator 14 and is in its secured, operative position affixed thereto. Also, when the receiver 48 is in the position of FIG. 2, the larger diameter of the distal end 64 of the connector 16 cannot be inserted into the illuminator 14 sufficient to reach a secured, operative position, since that larger diameter of distal end 64 cannot fit within the smaller aperture 50, thus the connector 16 used for phototherapy cannot be inserted into a secured, operative position in illuminator 14 with the receiver 48 when the smaller aperture 50 is aligned with the lamp 60 and the centerline of ring 38. Thus unfiltered light radiation cannot ever by introduced into the distal end 64 of the connector 16 to be transmitted to a woven fiberoptic pad for phototherapy for an infant.

The connector 16 can, obviously, only be inserted into its secured, operative position in the illuminator 14 when the receiver is moved in the direction of the arrow A such that the larger diameter aperture 52 is positioned aligned with the lamp 60 and the centerline of the ring 38. Therefore, to use the connector 16 for phototherapy the larger diameter aperture 52 must be properly aligned and thus it is insured that the filter media 58 is positioned to properly filter the light radiation from the lamp 60 and directed toward connector 16. Improperly filtered light radiation cannot, therefore, be used for phototherapy for an infant.

Figure 3:
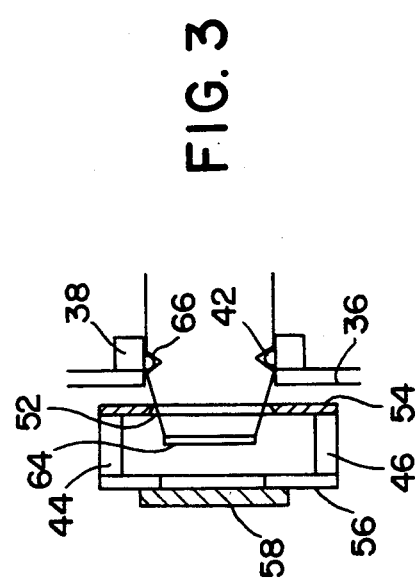
FIG. 3 is a side cross sectional view of a connector used with a phototherapy device in a secured, operative position with the present invention.

Turning now to FIG. 3, there is shown a side schematic view of a portion of the illuminator 14 constructed in accordance with the present invention and depicting a connector 16 used with a woven fiberoptic pad 10 (FIG. 1) in its operative or secured position with respect to the illuminator 14.

A V-groove 66 formed in the connector 16 receives the metal balls 42 that are biased inwardly in conventional fashion and which retain the connector 16 in a fixed, secured position within the ring 38. In this position, the connector 16 is secured in position to illuminator 14 and its distal end 64 is of a predetermined dimension such as to receive the light radiation from the lamp 60 (FIG. 2). Since FIG. 3 illustrates the connector 16 used with the phototherapy end use emitting device, the filter media 58 is positioned on back plate 56 so that all of the radiation form the lamp 60 is filtered before it reaches the distal end 64 of connector 16, and thus, only selected wavelengths within the desired spectrum are allowed to pass to the distal end 64 for transmission further to the woven fiberoptic pad 10 (FIG. 1).

The larger aperture 52 allows the distal end 64 of connector 16 to pass through so that the connector 16 can reach its secured position and the metal balls 42 are fitted within the V-groove 66. Obviously, the user knows when either connector is in its secured position by feeling a positive snap as the metal balls 42 enter either of the V-grooves 66 or 68.

Returning briefly to FIG. 2, it can be seen that the connector 16 cannot enter the smaller aperture 50 and thus the connector 16 cannot be placed into the secured position as shown in FIG. 3. Therefore, the operator would immediately know that the wrong aperture was in alignment with lamp 60 and that the unit would not operate.

The larger diameter of distal end 64 of the device used for phototherapy therefore cannot inadvertently be inserted into an operative, secured position in the illuminator 14 unless the proper aperture is positioned in alignment with lamp 60 and thus insuring that the proper filter is present in the path of the light radiation emanating from lamp 60 towards and impinging upon the distal end 64 of the connector 26 used for that phototherapy device. In the preferred embodiment, the diameter of the distal end 64 of connector 16 is shown as a tapered diameter, however, it can be seen that a uniform diameter distal end may also operate with the present invention as long as it fits snugly into the larger aperture 52 and not into the smaller aperture 50.

Taking further FIGS. 2 and 3, the distal end 62 of the connector 32 used for other purposes, such as a transilluminator 30 (FIG. 1) can be inserted into its operative or secured position to the illuminator 14 since the smaller diameter of that distal end 62 can fit into the larger aperture 52 or the smaller aperture 50, however, in the case of a transilluminator, no harm can be caused to the infant even when the filter media 58 is in position and filters out certain wavelengths of the light radiation from lamp 60 to the end use device. Accordingly, it is not a disadvantage to allow the end use device such as a transilluminator to receive filtered or unfiltered visible light radiation. Alternately, the smaller aperture 50 may have itself a filter (not shown) to provide selective wavelengths of light to the end use device.

Figure 4A:
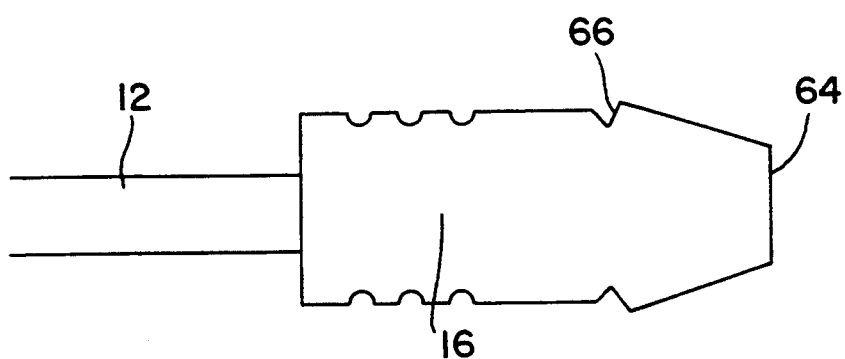
FIG. 4A is a side cross sectional view of a connector usable with a light emitting fiberoptic pad for providing phototherapy to an infant.
Figure 4B:
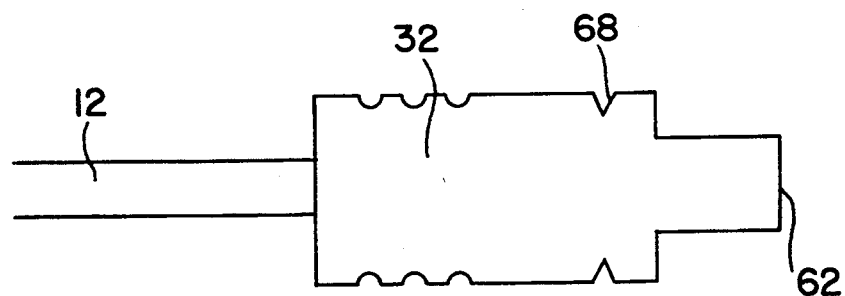
FIG. 4B is a side cross sectional view of a connector usable with an alternate light emitting end use device.

Turning finally to FIGS. 4A & 4B, there is shown cross sectional views of the connector 16 (FIG. 4A) and connector 32 (FIG. 4B) and illustrating the differing diameters of the distal ends 64 and 66, respectively. In each instance, the V-groove 66 of connector 16 and the V-groove 68 of connector 32 are similarly dimensioned so as to fit within the ring 38 in front plate 36 such that an operative or secured position is attained by the metal balls 42 entering into such V-grooves to retain the selected connector in a secured position in illuminator 14 so that the lamp 60 can transmit radiation upon the distal end of one or the other of the connectors 16 and 32 (FIGS. 2 & 3)

While the invention has been disclosed and described with respect to a single embodiment, it will become apparent the variations and modifications may be made therein, and it is therefore intended in the following claims to cover each such variation and modification as falls within the true spirit and scope of the invention.

We claim:

1. An illuminator for illuminating the connector end of one of a plurality of fiberoptic cables having at the other end thereof, light emitting devices for use with infants, at least one of such light devices being a phototherapy light device, said illuminator comprising:
- a housing having an opening therein of a predetermined diameter to accept each of said plurality of connector ends and to removably retain such connectors in secured position to said housing,
- an illuminator lamp positioned within said housing and adapted to direct light radiation toward the ends of each such connector when retained in said secured position to said housing,
- a receptor means having a plurality of apertures of differing diameters, each diameter being of a dimension to snugly receive the end of one of said connectors when such connector is in said secured position, said aperture receiving the phototherapy device connector having a diameter larger than the diameter of any other aperture such that the phototherapy device connector cannot be received within any other aperture,
- light filter means affixed to said receptor means and covering at least one of said apertures to filter the light radiation passing from said illuminator lamp to the end of at least one of said connectors, said filter means covering said aperture receiving the phototherapy device connector to limit light radiation therethrough to a predetermined wavelength spectrum nanometers,
- means to move said receptor to selectively position said apertures to position only one of said apertures at a time between said illuminator lamp and the end of one of said connectors, such that only one connector may be positioned in said secured position at a time.

2. An illuminator as defined in claim 1 wherein said plurality of apertures comprises two apertures.

3. An illuminator as defined in claim 2 wherein said means to move said receptor includes a slide operable by a user and located external of said housing.

4. An illuminator as defined in claim 3 wherein said filter means limits radiation therethrough to between about 400 and 550 nanometers.

5. An illuminator as defined in claim 2 wherein one of said plurality of light emitting devices comprises a transilluminator.

6. An illuminator for selectively supplying light radiation to one of two light emitting devices for use with infants, each of said light emitting devices being positioned at one end of a fiberoptic cable and each having a connector on the other end of the fiberoptic cable, said two connectors being of differing diameters, one of said light emitting devices being a phototherapy light device, said illuminator comprising:
- a housing having an opening therein of a predetermined diameter to accept both of said connector ends and to retain such connectors in secured position to said housing,
- an illuminator lamp positioned within said housing and adapted to direct light radiation toward the end of each connector when retained in said secured position to said housing,
- A receptor means within said housing and having a pair of apertures of differing diameters, each diameter being of a dimension to snugly receive one of said two connectors in order for said connectors to be in said secured position, said diameter of said aperture receiving said connector having the phototherapy device attached thereto having a larger diameter that said other aperture,
- a light filter associated with said receptor means and covering said aperture adapted to snugly receive said connector having the phototherapy device attached thereto, said filter limiting the passage of radiation through said aperture to a predetermined spectrum,
- a slide for moving said receptor means to selectively position either of said apertures to receive only one of said connectors at a time to a said secured position, wherein said connector having the phototherapy device attached thereto may only be in said secured position in said housing when said larger diameter aperture is in position to receive the connector of the phototherapy device.

7. An illuminator as defined in claim 6 wherein said light filter limits radiation passing through said larger diameter aperture to 400 nanometers to about 550 nanometers.

* * * * *